Nov. 14, 1944.  T. G. NYBORG  2,362,844
MECHANICAL LOADING AND CONVEYING OF LOOSE MATERIAL
Filed Sept. 4, 1943
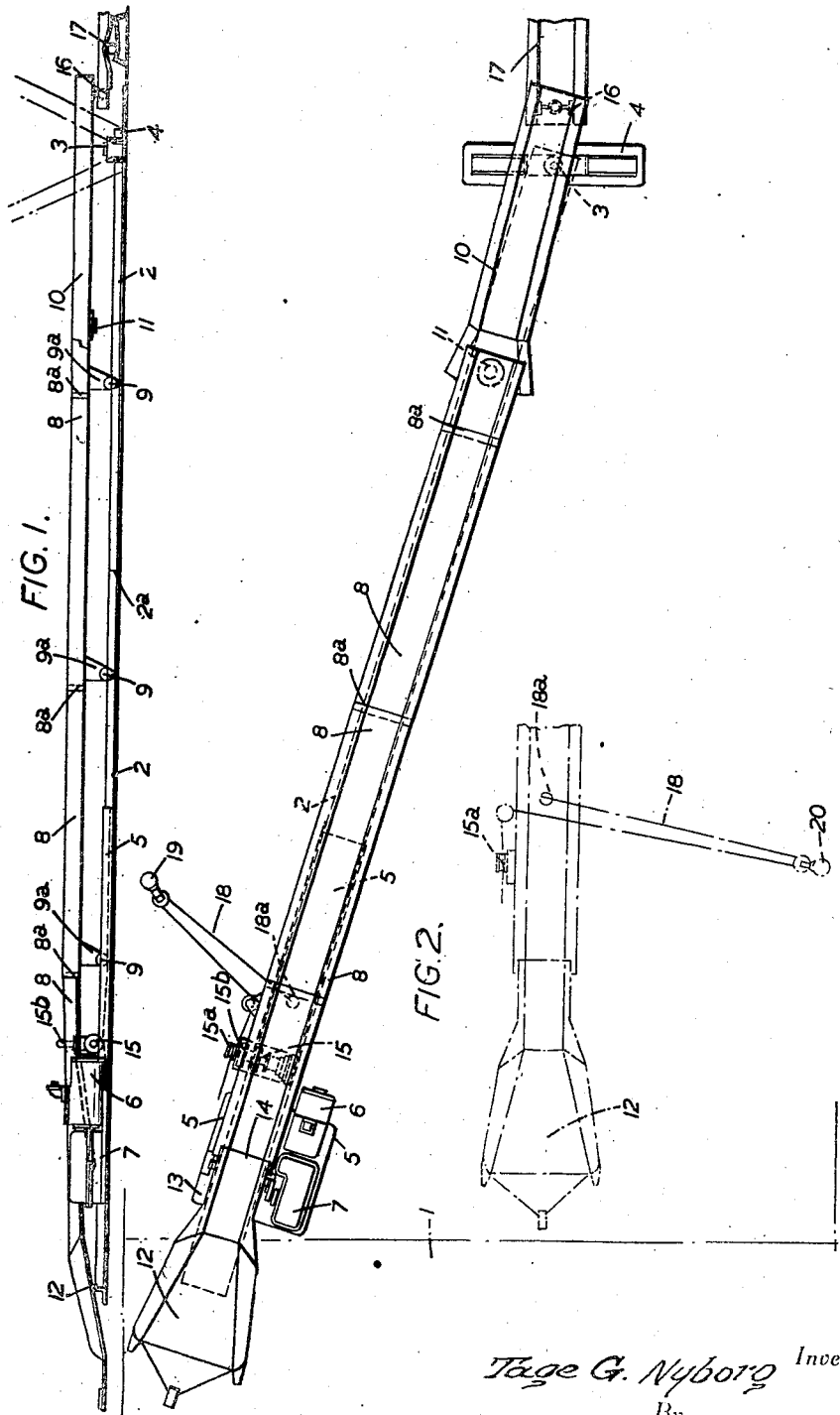
Inventor
Tage G. Nyborg
By
Attorney Patented Nov. 14, 1944

2,362,844

UNITED STATES PATENT OFFICE 2,362,844

MECHANICAL LOADING AND CONVEYING OF LOOSE MATERIAL

Tage Georg Nyborg, Worcester, England, assignor of one-half to The Mining Engineering Company Limited, Worcester, England Application September 4, 1943, Serial No. 501,313
In Great Britain July 1, 1942

3 Claims. (Cl. 198—220)

The use of telescopic loading shovels or "duckbill loaders" on the end of shaker conveyors for the loading of loose material in headings or rooms underground is well-known. There are, however, certain limitations in their use as the digging effort for the loading has commonly to be transmitted through the whole line of troughing and the conditions have to be favorable for shaker conveying.

The present invention is designed to provide for independent shovel loading in conjunction with a receiving conveyor of any appropriate type and over a considerable variety of conditions. The independent loading shovel unit has its own driving mechanism and may include a frame which is stationary during loading operations. A structure, pivoted to the frame at one end and having the driving motor and associated mechanism near the other, is telescopic (in the broad sense that its length is variable) and carries the loading shovel at the other end. The shovel discharges into a shaker trough carried by the pivoted structure and driven on a shaker cycle by the driving mechanism. The same driving mechanism preferably drives the shovel by direct crank or similar action, the telescoping mechanism and a winch for slewing the structure about its pivot.

The accompanying drawing shows a typical form embodying the above and other parts of the invention. The parts for which a monopoly is desired are those set out in the claims.

In the drawing—

Fig. 1 is a side elevation and

Fig. 2 is a plan view showing the apparatus as used in a room underground, showing in full line the shovel fully extended and slewed, and in dotted lines indicating the position it will assume when in alignment with the conveyor and fully retracted.

As illustrated, the apparatus is assumed to be working in a room underground with a strip 1 of broken down material to be loaded. A base structure 2, which may be jointed as necessary as indicated at 2a, has one end pivoted at 3 on a stationary pivot frame 4. A sliding section 5 of the base structure carries the driving motor 6, gearing 7 and associated mechanism to be described, the base structure being thus telescopic so that the whole sliding section 5 and the parts carried thereby can be power advanced or retreated, as hereafter described, with respect to the pivot point 3. A length of troughing 8, which may be jointed as necessary as indicated at 8a, is mounted on the base structure 2 through rollers 9 on supports 9a and is arranged to be reciprocated on a shaker conveyor cycle by the motor through conventional mechanism. A discharge section 10 is pivotally connected at 11 to the troughing 8.

A loading shovel 12 projecting beyond the base structure and resting on the floor at the outer end, is mounted on the driving mechanism by which it is reciprocated.

The inner end 14 is arranged to discharge into the trough 8. A winch bollard 15a driven by ratchet and pawl mechanism 15 from the shovel and mounted on the telescopic portion 5 of the base structure is associated with the driving mechanism for advancing or retreating the unit by conventional reversible ratchet and pawl controlled by lever 15b. The shovel may be coupled directly on axis 13 to crank arms of the driving mechanism and the trough 8 reciprocated through a double acting cushioning spring in the manner described in patent specification No. 1,770,006.

The discharge end of the trough discharge section 10 is pivotally supported on a swivelling roller carriage 16 which runs on the structure of the conveyor 17, which may be of any type, on to which the loading shovel is arranged to fill. It will be understood that the trough 8 with the discharge section 10, being attached to the driving mechanism, advances and retreats with it and its associated parts.

Let it be assumed that the working face of a heading or room has been undercut and the material broken down over the area 1. The loading shovel is located at the correct distance from the face so that it is just clear of the broken material when at its shortest length as indicated in the dotted position of Fig. 2. The stationary pivot frame 4 is placed approximately centrally in the heading and is secured by screw jacks or the like; the discharge trough is over the receiving conveyor. The loading shovel is slewed to one side of the heading by rope 18 attached to it at 18a and snatch block 19 as in the slewed position shown in full lines; the rope is then transferred round a snatch block 20 on the other side of the heading and round the winch bollard 15a. Alternatively, the slewing of the unit may be by hand-operated winch or pulling jack.

The loading shovel motor is started up and the shovel advanced into the heap by the power operation of the telescoping means advancing the sliding section 5 of the base structure, the material being taken away by the shaker conveying action of the trough 8, 10 and discharged on to the receiving conveyor 17. When the whole of the loose material within the width of the shovel has been loaded, the unit is telescoped back to its minimum length and, by means of the rope 18 and winch 15, the whole unit is slewed across to take the next web of material and the cycle repeated. When the whole of the loose material has been loaded out, the face is cut and shot down again, the jacks on the stationary pivot frame 4 removed and the loading shovel started up so that operation of the power telescoping means draws forward the stationary pivot frame and its associated parts until it is in its correct new position, when it is again jacked down.

The receiving conveyor is extended, the slewing rope changed over to the snatch block 19 on the other side of the heading and the unit is then ready to start the next loading cycle.

I claim:

1. A loading unit including a telescopic base, a reciprocating feed section superimposed relative to and movably supported on the base, an enlarged section at the operative end of the base, a shovel slidable relative to the enlarged section and having one end thereof overlying and discharging onto the feed section, power means on the enlarged section connected to the shovel for reciprocating the shovel and base, and manually controlled means for shortening or lengthening the unit for initially positioning the shovel, said means in part being operable for laterally shifting the shovel end of the unit.

2. A construction as defined in claim 1, wherein the end of the unit remote from the shovel is supported on a pivotal mounting having a limited lateral play.

3. A construction as defined in claim 1, wherein the feed section is carried by supports having roller bearing on the base.

TAGE GEORG NYBORG.